US012810660B2

(12) United States Patent
Nizamuddeen et al.

(10) Patent No.: US 12,810,660 B2
(45) Date of Patent: Nov. 24, 2026

(54) METHOD FOR REMOTE MONITORING, DIAGNOSIS AND CONTROL OF AN AUTONOMOUS OFF-HIGHWAY VEHICLE

(71) Applicant: ZF CV SYSTEMS GLOBAL GMBH, Bern (CH)

(72) Inventors: Imaduddeen Nizamuddeen, Vellore (IN); Vaisakh Venugopal, Porur (IN); Anto Ajisha Shriny Mariathanislaus, Tirunelveli (IN)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 35 days.

(21) Appl. No.: 18/998,528

(22) PCT Filed: Jun. 19, 2023

(86) PCT No.: PCT/EP2023/066348

§ 371 (c)(1),
(2) Date: Jan. 27, 2025

(87) PCT Pub. No.: WO2024/022676

PCT Pub. Date: Feb. 1, 2024

(65) Prior Publication Data

US 2025/0356700 A1 Nov. 20, 2025

(30) Foreign Application Priority Data

Jul. 28, 2022 (IN) ............................ 202211043198

(51) Int. Cl.
*G07C 5/00* (2006.01)
*H04L 67/12* (2022.01)

(52) U.S. Cl.
CPC .............. *G07C 5/008* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 7,155,321 | B2 | 12/2006 | Bromley et al. | |
| 2013/0246135 | A1* | 9/2013 | Wang | G06F 17/00 701/2 |
| 2013/0304278 | A1* | 11/2013 | Chen | G06F 17/00 701/2 |

(Continued)

*Primary Examiner* — Abdhesh K Jha
(74) *Attorney, Agent, or Firm* — LEYDIG, VOIT & MAYER, LTD.

(57) ABSTRACT

A method for monitoring, diagnosis and control of an autonomous vehicle, including transmitting data having software updates and log-data, diagnosis data and control data, between an Internet-accessible server and a communication unit in the vehicle not accessible via the Internet, the transmission executed through at least one intermediary mobile device and the data being temporarily cached in the mobile device. Based on a determination that the data should be transmitted from the server to the vehicle, triggering a first download of the data from the server to the mobile device by the server through a push notification and a download request to an owner of the mobile device, wherein the owner is prompted to activate a second download of the data from the mobile device to the communication unit in the vehicle.

18 Claims, 3 Drawing Sheets

(56) References Cited

U.S. PATENT DOCUMENTS

| | | | | |
|---|---|---|---|---|
| 2015/0061828 | A1* | 3/2015 | Fischer | G07C 9/20<br>340/5.61 |
| 2016/0210131 | A1 | 7/2016 | Vangelov et al. | |
| 2020/0174778 | A1* | 6/2020 | David | G06F 8/654 |

* cited by examiner

METHOD FOR REMOTE MONITORING, DIAGNOSIS AND CONTROL OF AN AUTONOMOUS OFF-HIGHWAY VEHICLE

CROSS REFERENCE TO RELATED APPLICATIONS

This application is a U.S. National Phase application under 35 U.S.C. § 371 of International Application No. PCT/EP2023/066348, filed on Jun. 19, 2023, and claims benefit to Indian patent application Ser. No. 202211043198, filed on Jul. 28, 2022. The International Application was published in English on Feb. 1, 2024 as WO 2024/022676 A1 under PCT Article 21(2).

FIELD

The present invention relates to a method for remote monitoring, diagnosis and control of an autonomous off-highway vehicle, to an in-vehicle communication unit or control unit to perform the method, to an autonomous off-highway vehicle with such a communication unit or control unit, to a computer program to perform steps of the disclosed method and to a mobile device comprising such a computer program.

BACKGROUND

The deployment of autonomous vehicles independently performing specific tasks without a driver or vehicle operator is on the increase but is still limited in its scope. While, in normal road traffic, autonomous vehicles appear rather scarcely, such vehicles for use off public roads, i.e., for example, vehicles for agricultural use, vehicles in non-public production and factory facilities or vehicles in surface mining/mining are more common. The reason for this is that there, the requirements arising in connection with the operation of autonomous vehicles with regard to the legal framework conditions and the interdependencies with the environment are easier to handle.

The operation of autonomous vehicles usually requires a continuous data connection, i.e. coverage by the Internet, by a radio network or access to specific and steady communication means including a centre or a control centre.

In prior art, systems are already known which render a substantially continuous connection between a control center and vehicles not driving autonomously possible. For example, U.S. Pat. No. 7,155,321 B2 discloses a data and information system for vehicles not driving autonomously in a vehicle fleet which serves to be capable of centrally processing as much information from the vehicles as possible to enable, for example, targeted on-time repair, maintenance, or diagnoses based on the operational parameters.

In summary, there is the problem that autonomously driving vehicles can be operated even without more comprehensive precautions off public roads and on fenced-off private property, but that precisely these locations are frequently only insufficiently provided with a satisfactory Internet coverage or sufficient radio networks. This results in a conflict of goals which resides in that an operation frequently fails due to the lack of a stable data connection precisely where autonomous vehicles are reasonably deployable.

SUMMARY

In an embodiment, the present disclosure provides a method for remote monitoring, diagnosis and control of an autonomous off-highway vehicle, comprising transmitting data, including software updates and log-data for performing the remote monitoring, diagnosis data and control data, between an Internet-accessible server and a communication unit in the vehicle not accessible via the Internet, the transmission executed through at least one intermediary mobile device, the data being temporarily cached in the mobile device. Based on a determination that the data should be transmitted from the server to the vehicle, triggering a first download of the data from the server to the mobile device by the server through a push notification and a download request to an owner of the mobile device, wherein the owner is also prompted to activate a second download of the data from the mobile device to the communication unit in the vehicle, based on the mobile device being in a vicinity of the autonomous off-highway vehicle and within a transmission range of a wireless local network connecting the vehicle and the mobile device. Based on a determination that, with reference to the data, there is a logging request for vehicle log-data from the server, triggering a push notification to the owner of the mobile device by the server, prompting the owner to first download selected log-data of the autonomous off-highway vehicle to the mobile device whenever the mobile device is within a reception range of the wireless local network and to subsequently transfer the selected log-data by a second download from the mobile device to the server based on the server being accessible again via Internet.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
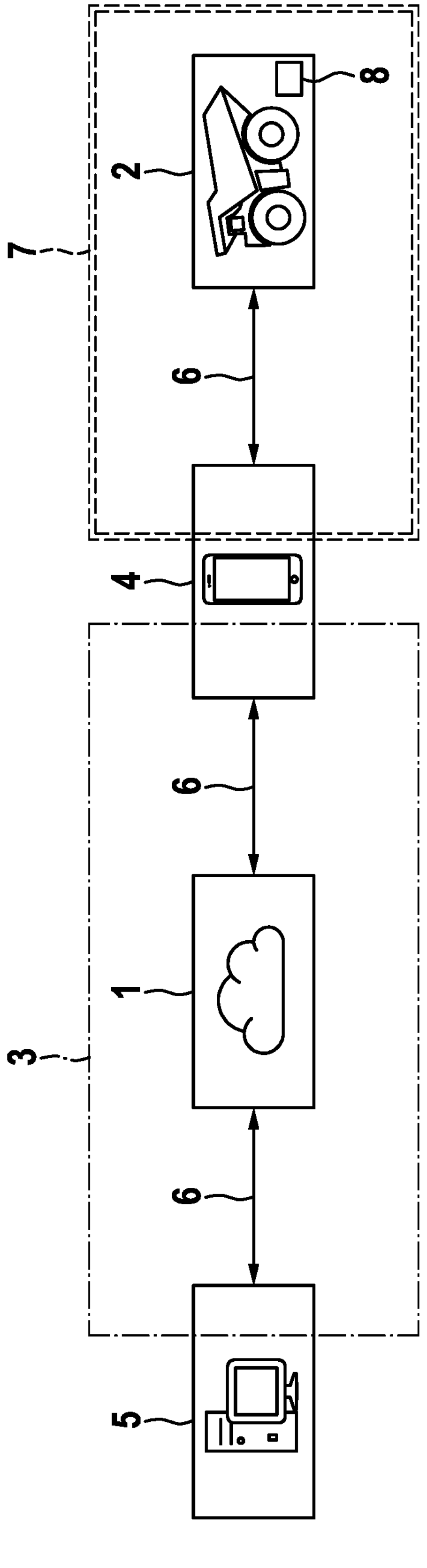
FIG. 1 shows a method according to an embodiment of the present disclosure in the form of a diagram.

In an embodiment, the present disclosure provides a method rendering a safe operation of autonomous vehicles possible even in locations where no safe and stable Internet coverage or data connections exist.

Embodiments of the present disclosure also include communication means capable of implementing the method, a vehicle equipped with such communication means, as well as application software and a mobile device equipped with this software.

In the method according to an embodiment of the present disclosure, the data for remote monitoring, diagnosis and control of an autonomous off-highway vehicle, comprising software updates and log-data for performing said monitoring, diagnosis and control is transmitted between an Internet-accessible server and a communication unit in the vehicle that is not accessible via the Internet, said transmission executed through at least one other intermediary mobile device.

According to the method of the present disclosure said data is temporarily cached in the mobile device, whereby in the event that said data should be transmitted from the server to the vehicle, a first download of said data from the server to the mobile device is triggered by the server through a push notification and download request to an owner of the mobile device, whereby the owner is also prompted to activate a second download of said data from the mobile device to the communication unit in the vehicle, whenever the mobile device is in the vicinity of the autonomous off-highway vehicle and within the reception range of a wireless local network connecting the vehicle and said mobile device, whereby in the event that, with reference to said data, there is a logging request for vehicle log-data from the server, a push notification to an owner of the mobile device is triggered by the server, prompting the owner to first download selected log-data of the autonomous off-highway vehicle to the mobile device whenever the latter is within the reception range of said wireless local network, and to subsequently transfer said selected log-data by a second download from the mobile device to the server as soon as the server is accessible again via Internet.

The advantage of the method according to the present disclosure is that, in the regions in which no complete network coverage by a radio network exists, a mobile device is used for bridging and for the transport of the required data. With the disclosed method, only connectivity between the mobile device and the autonomous vehicle is needed in the close range, for example via Bluetooth or via Wi-Fi, while, on the other hand, the possibility of only temporarily connecting the mobile device to a server and/or a database in an area having sufficient network coverage are required.

An embodiment of the present disclosure belongs to a method wherein the mobile device provides a first programmed application software (app) through which updates, software changes and logging data can be detected, selected and transmitted.

Such an app renders the provision of the method according to the present disclosure to each operator of autonomous vehicles possible without the necessity to build up further infrastructure directly on the operator's premises. It is sufficient that the vehicle itself comprises the required means and that the server accessible via the Internet is likewise capable of communicating with the App.

In order to ensure the required safety against manipulation of the transmitted data, the following further embodiments of the method according to the present disclosure are provided. In an embodiment of the present disclosure, said data is compressed and encrypted with an algorithmically generated security key. To this end, the owner of the mobile device also has to authenticate himself through said first application software (App) and said first application software includes a database to store said data as received and encrypted before.

Also referring to safety considerations is an embodiment of the disclosed method, wherein the encrypted data stored in the first applications database is secured against access by the owner of the mobile device, regardless of whether it is server data or log data.

In an embodiment of the disclosed method said first application software is programmed to automatically connect to said communication unit in the vehicle whenever the mobile device is within the transmission range of a wireless local network connecting the vehicle and said mobile device, and to automatically transmit said data in encrypted format.

In this way, a completely automatic transmission of data can be realised without the owner of the mobile device being required to excessively intervene. This is particularly operational in an embodiment of the method according to the present disclosure, where, in a vehicle control unit, a second programmed application software is foreseen which is working cooperatively with said first application software in the mobile device.

An embodiment of the present disclosure is related to a method where, in the event that said data should be transmitted to the vehicle, said first and second application software work cooperatively as follows:

after connecting the mobile device to the vehicle, a decryption of said data to be transmitted is executed, a flashing of the control unit in the vehicle with updated software and data is executed, a return message designating the latest state of software and data available in the vehicle is downloaded to the mobile device, whereby the owner is prompted to download the return message from the mobile device to the server as soon as the server is accessible again via Internet.

In this way, it is ensured that the current status of the autonomous vehicle and the current software included therein is traceable and present on the server or in the control centre at any time.

In an embodiment of the disclosed method the encrypted data in the first applications database is deleted after executing the download of the return message to the server. This prevents accidentally using outdated versions of the software or older data on further connections between server, mobile device and autonomous vehicle.

An embodiment of the present disclosure belongs to a method, where in the event that there is a logging request for vehicle log-data said first and second application software work cooperatively as follows;

after connecting the mobile device to the vehicle, the owner is prompted to select a logging period, said selection is transferred to the vehicle through the mobile device, after compressing log-data by the second application software and protecting it with an algorithmically generated security key said log-data is transmitted to the mobile application and stored in the mobile application database in encrypted format, said log-data is automatically transferred from the mobile device to the server by the first application software, when the server is accessible again via Internet.

In this way, the operational data of the autonomous vehicle collected within a specified period of time can be recorded and transmitted to the server or to another control centre without continuous network coverage or a continuously available radio network between server and vehicle being required.

Also, in this case of data transmission, an embodiment of the disclosed method includes deleting the encrypted log-data in the first applications database after transferring it to the server. As mentioned above, this prevents accidentally using outdated versions of the software or older data.

An embodiment of the present disclosure includes a method, wherein said data at least partly is stored or processed by cloud-based programs or servers. This facilitates access to the relevant data from different places, vehicles, and for users. Moreover, storage space or computing capacity does not have to be expanded at elevated levels in individual places.

An embodiment of the present disclosure is characterized in using the method in particular for remote monitoring, diagnostics and control of agricultural vehicles or mining vehicles.

Precisely for agricultural vehicles or for vehicles in surface mining or on factory premises, the method is particularly suitable for solving the conflict of goals already mentioned above which resides in that operation frequently fails due to the lack of a stable data connection where autonomous vehicles are reasonably deployable without much effort.

An embodiment belongs to a communication unit or control unit in a vehicle, being provided with data processing means to perform disclosed method, whereby said communication or control unit comprises transmitting means to transfer data within a wireless local network connecting the vehicle and a mobile device.

An embodiment of the present disclosure belongs to an autonomous off-highway vehicle, in particular farming tractor or agricultural vehicle, with such a communication unit or control unit to perform the disclosed method.

An embodiment of the present disclosure belongs to an application software (app) to perform the disclosed method, said application software being storable on a mobile device and/or in a communication or control unit of a vehicle, providing communication between mobile device, vehicle and the internet.

An embodiment of the present disclosure belongs to a computer program comprising program code means for performing the steps to be executed by the mobile device of the method according to the present disclosure when said program is run on a computer of said mobile device.

An embodiment of the present disclosure belongs to a computer program comprising program code means for performing the steps to be executed by the communication unit or the control unit of the vehicle of the method according to the present disclosure when said program is run on a computer of the communication unit or the control unit of the vehicle.

An embodiment of the present disclosure belongs to mobile device, in particular smart phone, comprising a computer program for said mobile device.

FIG. 1 shows in the form of a diagram the basic principle of the method according to the present disclosure in which remote monitoring, remote diagnosis and control of an autonomously and automatically driving vehicle operated off publicly accessible areas, i.e. not located on public roads, paths or lanes, is performed.

For operating such a vehicle, data 6 have to be exchanged between at least one control entity implemented as a cloud server 1 and an autonomously and automatically driving heavy load vehicle 2 in a stone quarry. These data include, for example, updates of software for such a vehicle, operational data (log data) of the vehicle, measurement data, diagnosis data for the vehicle equipment, etc. With the method according to the present disclosure, such data can be exchanged even when the vehicle 2 is not positioned in the range of a commonly accessible radio network or has no stable Internet connection 3. The Internet connection or the radio network 3 is shown by the dash-dot line in FIG. 1. The Internet connection 3 thus includes the cloud server 1, a mobile device 4 located within the radio network/Internet 3 at certain points in time, as well as also a control or development centre 5 here which, for example, develops new software and makes it available through the cloud server 1. However, the control or development centre 5 can also acquire operational data of the vehicle 2, analyse them statistically, and determine instructions for general maintenance therefrom.

When transmitted from the server 1 to the vehicle 2 the data 6 are first transmitted to the mobile device 4 in an encrypted form and are stored there. The mobile device 4 is, for example, a mobile telephone owned by the operator of the heavy load vehicle 2 and only sometimes located in the vicinity of the vehicle, but then—in the close vicinity of the vehicle-capable of establishing a wireless connection 7 to the vehicle 2. In the diagram, the wireless connection 7 in the close range of the vehicle 2 is represented by a double-dash line.

The data transmission is then performed so that, following a request by associated program routines of the cloud server 1, the owner of the mobile telephone/mobile device 4 heads towards the vicinity of the autonomous vehicle 2 and initiates the appropriate measures for either data transfer or the acquisition of operational data (log data) there.

In the event that data 6 shall be transmitted from the server 1 to the vehicle 2, a first download of said data from the server 1 to the mobile device 4 is triggered by the server 1 through push notification and download request to an owner of the mobile device 4, whereby the owner is also prompted to activate a second download of said data 6 from the mobile device 4 to a communication unit 8 in the vehicle 2, whenever the mobile device 4 is in the vicinity of the autonomous off-highway vehicle 2 and within the reception range of a wireless local network 7 being able to connect the vehicle 2 and the mobile device 4.

In an opposite case, i.e., in the event that there is a logging request from the cloud server 1 for vehicle log-data or for operating data of the vehicle 2, a push notification to an owner of the mobile device 4 is triggered by the server, prompting the owner to first download selected log-data of the autonomous off-highway vehicle 2 to the mobile device 4 whenever the latter is within the reception range of said wireless local network 7, and to subsequently transfer said selected log-data by a second download from the mobile device 4 to the server 1 as soon as the server 1 is accessible again via Internet 3.

Figure 2:
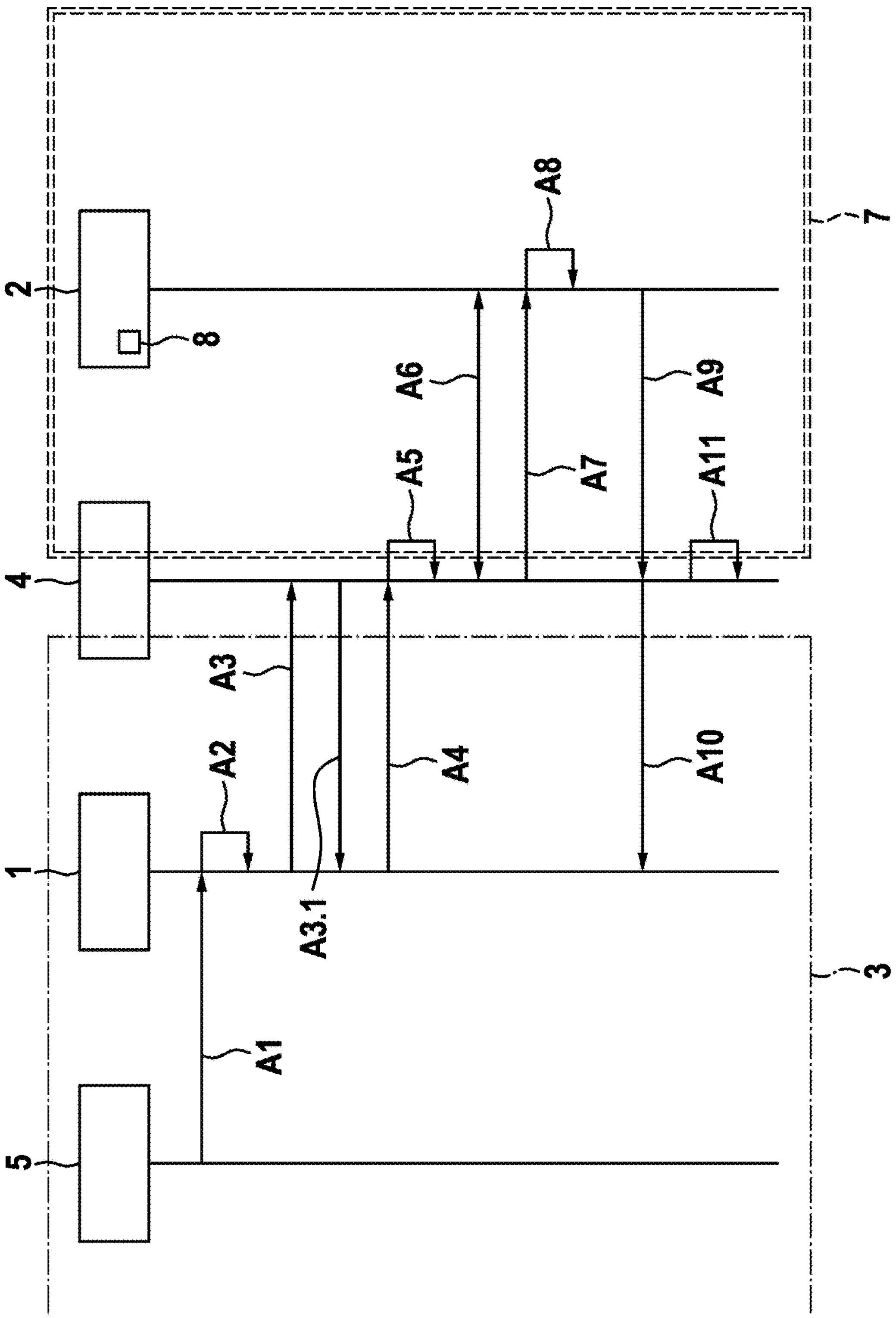
FIG. 2 shows a flow diagram illustrating fundamental steps of a first part of a method according to an embodiment of the present disclosure.
Figure 3:
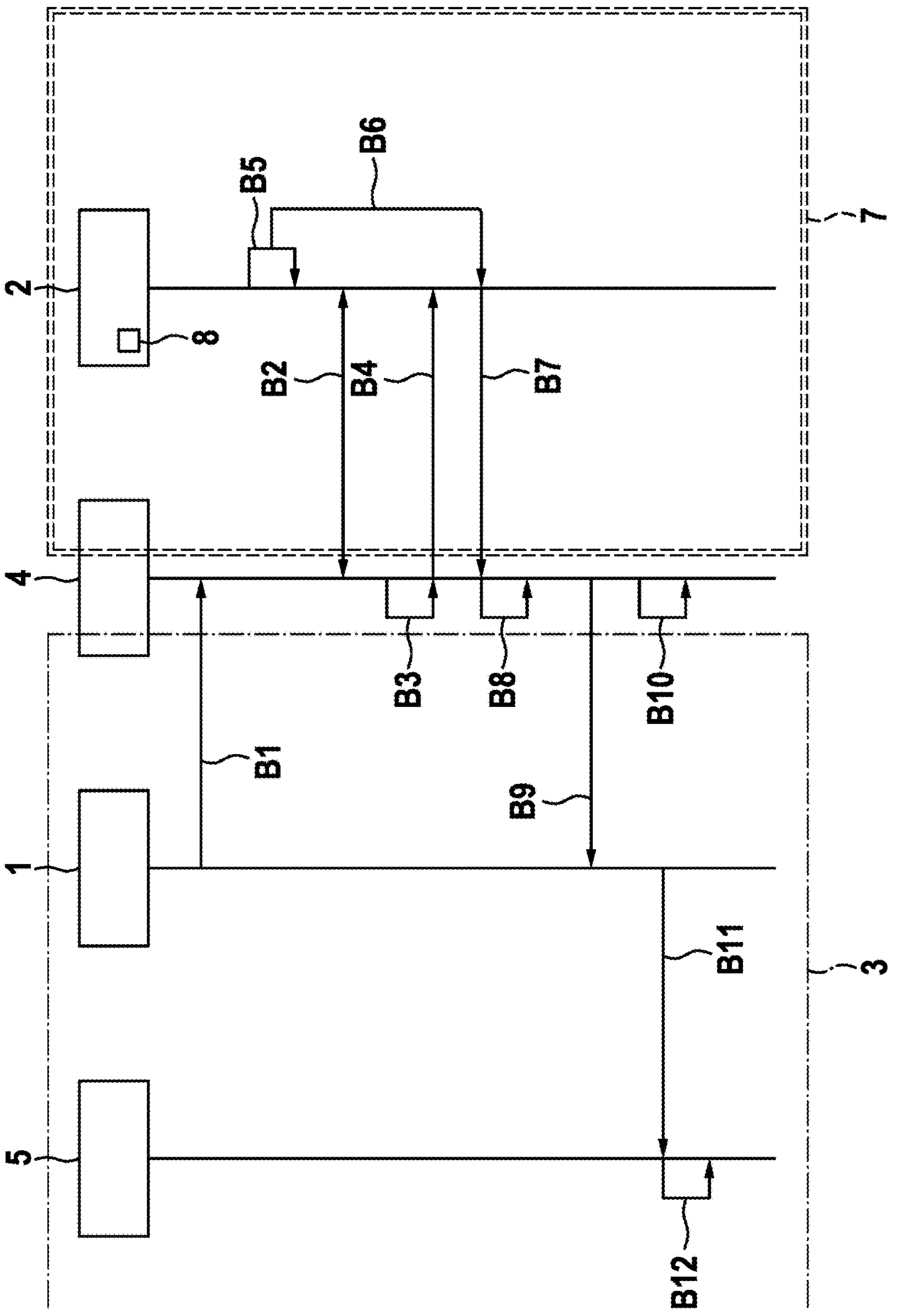
FIG. 3 shows a flow diagram illustrating fundamental steps of a second part of the method according to an embodiment of the present disclosure.

FIGS. 2 and 3 respectively show a flow diagram illustrating the fundamental steps of the method according to the present disclosure which are to be performed by the individual means 1, 2, 4, and 5 required for performing the method. Here, FIG. 2 shows the case in which data 6 are transmitted to an autonomous vehicle 2 from a cloud server 1. FIG. 3, in contrast, shows the case in which the operational data or logs from the vehicle 2 are transmitted to the cloud server 1.

In FIG. 2, a first step or a first action A1 can be seen which involves the transmission of a new software update for the vehicle 2 by the control center 5 to the cloud server 1 via the Internet 3. In the cloud server 1, then, action A2 is performed in which the data package is encrypted. Furthermore, action A3 is performed, namely a notification transmitted via an Internet connection 3, a so-called "push notification", to the mobile device 4 indicating that a software update is available. Likewise, an action A3.1 can be provided enabling a request from the mobile device 4 as to whether, for example, a new software update is available.

Accordingly, when a new software update is available or an update is intended, an action A4 is performed in which the encrypted data of the software update are downloaded into the mobile device 4 via the existing Internet connection 3. In a subsequent step A5, the transmitted data are stored in the corresponding app for software updating in the mobile device 4.

As soon as the app of the mobile device 4 determines that the mobile device 4 is in the close range, i.e. in the vicinity of the autonomous vehicle 2, a wireless local connection 7 between the mobile device 4 and the autonomous vehicle 2 is established in an action A6, for example by establishing a temporary Wi-Fi or Bluetooth connection.

As soon as the wireless connection 7 is established and secured, the encrypted data of the software update are transmitted to the vehicle 2 or to an application software (app) installed in a control or communication unit 8 there in a step A7 and decrypted in a following step A8.

After the download in step A7 and decryption in step A8 of the data of the software update in the vehicle 2, the update status of the vehicle 2 is first reported to the mobile device 4 in a step A9, and later, when the mobile device 4 is in an area having a functioning Internet coverage 3 again, uploaded to the cloud server 1 in a step A10. Subsequently, only a deletion of the encrypted data still present in the mobile device 4 is performed in a final step A11.

FIG. 3 shows the case in which, in a step or in an action B1, a request to acquire operational data of the autonomous vehicle 2, i.e. the request to transmit operational data or logs from the vehicle 2 back to the cloud server 1 is transmitted by the server 1 to the mobile device 4 or to its owner via an existing Internet connection 3 so that they can be processed there or in another facility 5.

Following this request, the owner of the mobile device will head for the vicinity of the autonomous vehicle 2 with the mobile device 4. If this is the case, i.e. when the mobile device 4 is in the close range, in the vicinity of the autonomous vehicle 2 a wireless local connection 7 is established between the mobile device 4 and the autonomous vehicle 2 in an action B2, for example by establishing a temporary Wi-Fi or Bluetooth connection. This establishment of a connection substantially corresponds to step A6 as shown in FIG. 1.

In an action B3, then, for which period of time a transmission of the operational data of the vehicle 2 is requested is specified by the owner or the mobile device 4. Subsequently, this time determination is transmitted to the vehicle 2 or to its control or communication unit 8 and the communicating second application software (app) installed there in a step/an action B4.

In the control unit of the vehicle 2 or in the application software present there, a compilation (a log file) for the requested period of time is prepared in an action B5 and packed and encrypted in a step B6. A step B7 follows in which the encrypted data are transmitted to the mobile device via the established local wireless connection 7.

In a step B8 substantially corresponding to step A5 of FIG. 2, the transmitted data will then be saved in the app on the mobile device 4. When the local device is then moved away from the close vicinity of the vehicle 2 and out of the wireless local connection and has eventually reconnected to the cloud server 1 via an existing Internet connection 3 the requested operational data (log file, log data) are transmitted to the cloud server 1 in a step B9. Then, the operational data can be transferred to a control or development center 5 which will process and statistically analyse the operational data and determine instructions for the general maintenance therefrom in actions/steps B11 and B12.

Important in any case is also the step or action B10 provided for in the mobile device 4 which involves the deletion of the encrypted data in the mobile device 4 after the transmission of the data to the cloud server 1.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS (Part of the Specification)

1 Cloud Server
2 Autonomous Vehicle
3 Internet Connection, Radio Network
4 Mobile Device
5 Software Development Center, Control Center
6 Data
7 Wireless local Network
8 Control Unit/Communication Unit
A1 Transfer of Data 6 for Software Update to Cloud-Server 1
A2 Compress and encode Data 6
A3 Send Push Notification
A3.1 Check for availability of Software Update
A4 Download Software Update to Mobile Device 4
A5 Store encrypted Software Update in Mobile Device 4
A6 Establish connection to Wireless local Network 7
A7 Send encrypted Software Update to autonomous Vehicle 2
A8 Decrypt and uncompress Data 6
A9 Send status of Update Version to Mobile Device 4
A10 Send status of Update Version to Server 1
A11 Delete encrypted Data 6 from the Mobile Device 4
B1 Send Push Notification for Logging Request
B2 Establish connection to Wireless local Network 7
B3 Select time period for log data
B4 Communicate selected time period for log data to Vehicle 2
B5 Generate log file for time period
B6 Compress and encode log file/log data
B7 Transfer log data/log file to Mobile Device 4
B8 Store encrypted log data/log file in Mobile Device 4

B9 Send log data/log file to Server 1

B10 Delete encrypted log data/log file from Mobile Device 4

B11 Transfer log data/log file to Control-and Development Center 5

B12 Evaluate log data/log file

The invention claimed is:

1. A method for remote monitoring, diagnosis and control of an autonomous off-highway vehicle, comprising:

transmitting data, comprising software updates and log-data for performing the remote monitoring, diagnosis data and control data, between an Internet-accessible server and a communication unit in the vehicle that is not accessible via the Internet, the transmission executed through at least one other intermediary mobile device, the data being temporarily cached in the mobile device;

based on a determination that the data should be transmitted from the server to the vehicle, triggering a first download of the data from the server to the mobile device by the server through a push notification and a download request to an owner of the mobile device, wherein the owner is also prompted to activate a second download of the data from the mobile device to the communication unit in the vehicle, based on the mobile device being in a vicinity of the autonomous off-highway vehicle and within a transmission range of a wireless local network connecting the vehicle and the mobile device;

based on a determination that, with reference to the data, there is a logging request for vehicle log-data from the server, triggering a push notification to the owner of the mobile device by the server, prompting the owner to first download selected log-data of the autonomous off-highway vehicle to the mobile device whenever the mobile device is within a reception range of the wireless local network and to subsequently transfer the selected log-data by a second download from the mobile device to the server based on the server being accessible again via Internet;

and causing the owner of the mobile device to authenticate through a first programmed application software provided by the mobile device and through which software updates, software changes, and logging data can be detected, selected and transmitted.

2. The method according to claim 1, wherein the data is compressed and encrypted with an algorithmically generated security key.

3. The method according to claim 2, wherein the first programmed application software includes a database to store the data as received and encrypted.

4. The method according to claim 3, wherein the encrypted data stored in the database is secured against access by the owner of the mobile device, regardless of whether the encrypted data is server data or log data.

5. The method according to claim 1, wherein the first programmed application software is programmed to automatically connect to the communication unit in the vehicle based on the mobile device being within the reception range of a wireless local network connecting the vehicle and the mobile device, and to automatically transmit the data in encrypted format.

6. The method according to claim 1, wherein in a vehicle control unit or the communication unit a second programmed application software is provided which is configured to work cooperatively with the first programmed application software in the mobile device.

7. The method according to claim 6, wherein, based on a determination that the data should be transmitted to the vehicle the first and second programmed application software are configured to work cooperatively as follows:

after connecting the mobile device to the vehicle, a decryption of the data to be transmitted is executed by the second programmed application software, a memory flashing of the control unit in the vehicle with updated software and data is executed, and a return message designating a latest state of software and data available in the vehicle is downloaded to the mobile device, wherein the owner is prompted to download the return message from the mobile device to the server when the server is accessible again via Internet.

8. The method according to claim 7, wherein the encrypted data in the database is deleted after executing the download of the return message to the server.

9. The method according to claim 1, wherein, based on a determination that there is a logging request for vehicle log-data, the first and second programmed application software are configured to work cooperatively as follows;

after connecting the mobile device to the vehicle, the owner is prompted to select a logging period and the selection is transferred to the vehicle through the mobile device, after compressing log-data by the second application software and protecting it with an algorithmically generated security key the log-data is transmitted to the mobile application and stored in the mobile application database in encrypted format, the log-data is automatically transferred from the mobile device to the server by the first programmed application software, based on the server being accessible again via Internet.

10. The method according to claim 9, wherein the encrypted log-data in the database is deleted after the encrypted log-data is transferred to the server.

11. The method according to claim 1, wherein the data at least partly is stored or processed by cloud-based programs or servers.

12. The method according to claim 1, wherein the vehicle is an agricultural vehicle or a mining vehicle.

13. A communication unit or control unit in a vehicle, configured to perform the method according to claim 1, wherein the communication or control unit comprises a transmitter configured to transfer data within a wireless local network connecting the vehicle and a mobile device.

14. An autonomous farming tractor or agricultural vehicle comprising the communication unit or the control unit according to claim 13.

15. A non-transitory computer-readable medium having processor-executable instructions stored thereon, wherein the processor-executable instructions, when executed by one or more processors, facilitate performance of the method according to claim 1.

16. A non-transitory computer-readable medium having processor-executable instructions stored thereon, wherein the processor-executable instructions, when executed by one or more processors, facilitate performance of the steps to be executed by the mobile device of the method according to claim 1.

17. A non-transitory computer-readable medium having processor-executable instructions stored thereon, wherein the processor-executable instructions, when executed by one or more processors, facilitate performance of the steps to be executed by the communication unit or the control unit of the vehicle of the method according to claim 1.

18. A smart phone, comprising the non-transitory computer-readable medium according to claim 17.

* * * * *